(12) United States Patent
Tanoue

(10) Patent No.: US 7,695,866 B2
(45) Date of Patent: Apr. 13, 2010

(54) BATTERY POSITIVE ELECTRODE MATERIAL

(75) Inventor: Koji Tanoue, Honjo (JP)

(73) Assignee: Dowa Electronics Materials Co., Ltd., Tokyo (JP)

( * ) Notice: Subject to any disclaimer, the term of this patent is extended or adjusted under 35 U.S.C. 154(b) by 1055 days.

(21) Appl. No.: 11/387,806

(22) Filed: Mar. 24, 2006

(65) Prior Publication Data
US 2006/0222932 A1 Oct. 5, 2006

(30) Foreign Application Priority Data
Mar. 31, 2005 (JP) ............................. 2005-101167

(51) Int. Cl.
*H01M 4/48* (2006.01)
*H01M 4/53* (2006.01)
*H01M 4/54* (2006.01)
(52) U.S. Cl. ..................... 429/218.1; 429/219; 429/223; 423/593.1; 423/594.3; 423/604; 29/623.1
(58) Field of Classification Search ................... 429/127
See application file for complete search history.

(56) References Cited

U.S. PATENT DOCUMENTS

2002/0127469 A1* 9/2002 Mori et al. .................. 429/174
2003/0082450 A1* 5/2003 Tanoue et al. ............... 429/219

FOREIGN PATENT DOCUMENTS

| JP | 57-000849 | 1/1982 |
| JP | 10-188975 | 7/1998 |

* cited by examiner

*Primary Examiner*—Dah-Wei D Yuan
*Assistant Examiner*—Katherine Turner
(74) *Attorney, Agent, or Firm*—Clark & Brody

(57) ABSTRACT

Material for the positive electrode of batteries is provided that has good conductivity and can be manufactured more cheaply than $AgNiO_2$. The battery positive electrode material is a conductive chemical compound represented by the general formula $Ag_xNi_yO_2$ (wherein X/Y is smaller than 1 and not smaller than 0.25). The conductive chemical compound is constituted of a crystal that has an X-ray diffraction main peak that is the same as that of $AgNiO_2$ (wherein X=Y=1), and does not exhibit a $Ag_2O$ or AgO peak. This conductive compound can be used as an additive to impart conductivity to the silver oxide ($Ag_2O$) of the positive electrode material.

10 Claims, 2 Drawing Sheets

BATTERY POSITIVE ELECTRODE MATERIAL

FIELD OF THE INVENTION

The present invention relates to a material for the positive electrode of a battery.

DESCRIPTION OF THE PRIOR ART

Small silver oxide alkaline batteries (commonly called "button" batteries) are in general use. In a silver oxide battery, silver oxide is used as the positive electrode material, zinc dust as the negative electrode material, and for the electrolyte, an alkaline solution, such as an aqueous solution of KOH or NaOH. Silver oxide has a high service capacity (discharge capacity), but because silver oxide itself has a resistance that is close to that of an insulator, it is usually blended with a conductive material such as graphite to impart conductivity to the positive electrode material.

Reference Nos. 1 to 3 disclose the use of the silver-nickel compound oxide $AgNiO_2$ as a battery positive electrode material. Reference No. 1 (JP S57-849A), for example, describes obtaining a flat discharge voltage curve from a battery having a positive electrode formed of $AgNiO_2$ synthesized by the equimolar (molar ratio=1/1) reaction of silver nitrate and nickel nitrate, and Reference No. 2 (JP H10-188975A) describes a manufacturing method for optimizing a $AgNiO_2$ synthesizing reaction, and a battery with stable discharge characteristics obtained when the $AgNiO_2$ was used as the positive electrode material. Reference No. 3 (US 2002/0127469 A1) describes a button battery with an electrode container containing $AgNiO_2$ mixed with silver oxide or manganese dioxide.

OBJECT OF THE INVENTION

It may be possible for batteries with positive electrodes constituted by the $AgNiO_2$ described in the above references to exhibit high capacity and stable discharge characteristics. However, in practice no such technology has been realized. Current silver oxide batteries generally use silver oxide as the positive electrode material, blended with an appropriate amount of graphite for conductivity.

One reason for this is that although $AgNiO_2$ has a lower silver content than silver oxide, manufacturing it requires complex processes, in addition to which the unit cost of the oxidizing agent is quite high. As such, when manufactured using the same scale of equipment as in the case of silver oxide, it was not necessarily a cheap material to obtain. Therefore, from users there has been a desire for a battery positive electrode material that is cheaper than $AgNiO_2$ and has good conductivity.

The object of the present invention is to provide a battery positive electrode material that is cheaper to manufacture than $AgNiO_2$ and has good conductivity.

SUMMARY OF THE INVENTION

Based on the results of much experimentation and research, the present inventor discovered a $Ag_xNi_yO_2$ based composite oxide that has a lower silver content than $AgNiO_2$ but good conductivity, and the characteristics of an active substance that makes it a suitable material for positive electrodes. When this composite oxide is blended with silver oxide and made into pellets, the silver content is low but imparts good conductivity, which also makes it a suitable material for positive electrodes.

That is, the present invention provides a battery positive electrode material comprising a conductive chemical compound represented by a general formula $Ag_xNi_yO_2$ (wherein X/Y is smaller than 1 and not smaller than 0.25). This battery positive electrode material is a conductive chemical compound constituted of a crystal that has an X-ray diffraction main peak that is the same as that of $AgNiO_2$ (wherein X=Y=1), does not exhibit a peak that typifies $Ag_2O$ and $AgO$ crystals, and also does not exhibit a peak that typifies $Ni(OH)_2$ and $NiOOH$ crystals. A positive electrode material having excellent conductivity and discharge characteristics can be obtained by blending this conductive compound with silver oxide ($Ag_2O$). The conductive compound can be produced by reacting Ag salt and Ni salt in water to precipitate a chemical compound represented by the general formula $Ag_xNi_yO_2$ (wherein X/Y is smaller than 1 and not smaller than 0.25), separating the precipitate from the liquid, washing the precipitate, and drying the precipitate in an atmosphere that does not contain $CO_2$.

The battery positive electrode material of this invention is cheaper than $AgNiO_2$, has good conductivity and functions as an active substance. As such, in addition to functioning on its own as a positive electrode material, it can be blended with silver oxide to form a positive electrode material that exhibits low resistance and excellent discharge characteristics that is also cheap, having a silver content that is lower than that of silver oxide.

DETAILED DESCRIPTION OF THE INVENTION

As stated in the above, the present inventor discovered a chemical compound that, even with a higher nickel content than that of $AgNiO_2$, has the same crystal structure as that of $AgNiO_2$, and the same discharge characteristics as $AgNiO_2$. Although the molar ratio Ag/Ni in this compound is smaller than 1, and thus is smaller than in the case of $AgNiO_2$, it has a crystal structure equivalent to that of $AgNiO_2$ and can therefore be represented by the general formula $Ag_xNi_yO_2$ (X/Y<1). Preferably, X/Y is 0.92 or lower, and not smaller than 0.25.

The compound can be called an Ag-excess Ni delafossite type oxide, which hereinbelow is shortened to "Ag-excess Ni oxide." As in the case of $AgCoO_2$ and the like, $AgNiO_2$ can be regarded as being a delafossite type oxide represented by $ABO_2$ in which A is a univalent metal and B a trivalent metal. A delafossite type oxide has a crystal structure comprising alternating packed beds of A—O—B—O—, and although it is an oxide, it is conductive. While the excess Ni in the case of the Ag-excess Ni oxide of this invention also can be seemed to be described as a departure from previously-defined delafossite type oxides since the Ag and Ni are not equimolar, what the present inventor has clarified is that it has the same crystal structure and exhibits good conductivity. In Japanese Patent Application No. 2004-375474, the present inventor disclosed a battery positive electrode material having the same crystal structure as that of $AgNiO_2$ that contained excess Ag.

Figure 1:
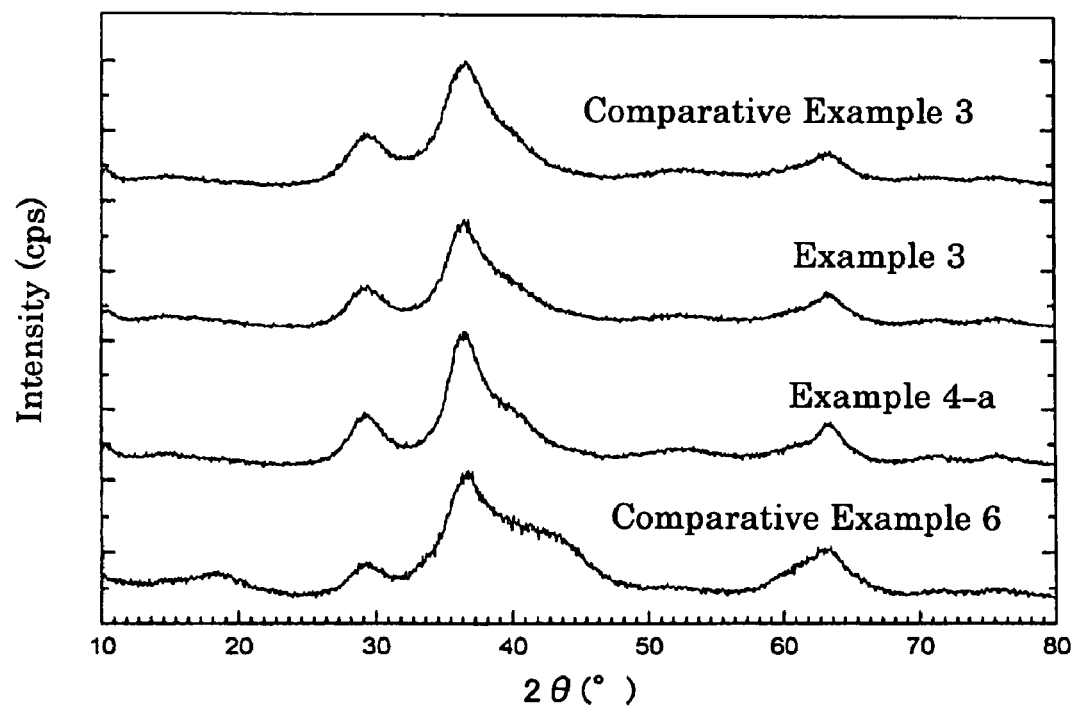
FIG. 1 shows X-ray diffraction charts of representative Ag-excess Ni oxides according to the invention, shown compared to the X-ray diffraction of $AgNiO_2$.

FIG. 1 shows X-ray diffraction patterns of the Ag-excess Ni oxide of inventive Examples 3 and 4a (described later), compared to that of the AgNiO$_2$ of Comparative Example 3. As shown in FIG. 1, the main peaks of the Ag-excess Ni oxide of Example 3 in which the Ag/Ni molar ratio is 0.6/1.40, that is, X/Y=0.43, and of the Ag-excess Ni oxide of Example 4a in which the Ag/Ni molar ratio is 0.4/1.60, that is, X/Y=0.25, coincide with the main peak of the AgNiO$_2$ compound of Comparative Example 3, and the other peaks also substantially coincide. In the Ag-excess Ni oxide of the present invention, the Ni could be in a solid solution in the Ag layer of the A—O—B—O— alternating packed beds of the delafossite type oxide (Ag—O—Ni—O-layers in the case of the compound of the present invention). However, the Ag$^{+1}$ ion radius is around 1.7 times the Ni$^{+3}$ ion radius, so there is an inherent limit to the solid solution range of the Ni. Therefore, in the case of the Comparative Example 6 shown in FIG. 1 in which there is a large amount of excess Ni, other peaks show up in the vicinity of 2θ=19° and 43°, confirming the coexistence of another phase.

The Ag—Ni excess oxide of this invention can be used on its own as a positive electrode material. However, by substituting the Ag-excess Ni oxide of the invention for part of the silver oxide used as the positive electrode material in a silver oxide battery, it is possible to obtain a high-performance positive electrode material having good conductivity, even without blending graphite or the like with the material. Improvements in the conductivity of silver oxide can start to be achieved by blending in amounts of the Ag-excess Ni oxide of as little as several weight percent (wt %). Therefore, the amount of such addition is set at 2 wt % or more, preferably 3 wt % or more, and more preferably 5 wt % or more.

Figure 2:
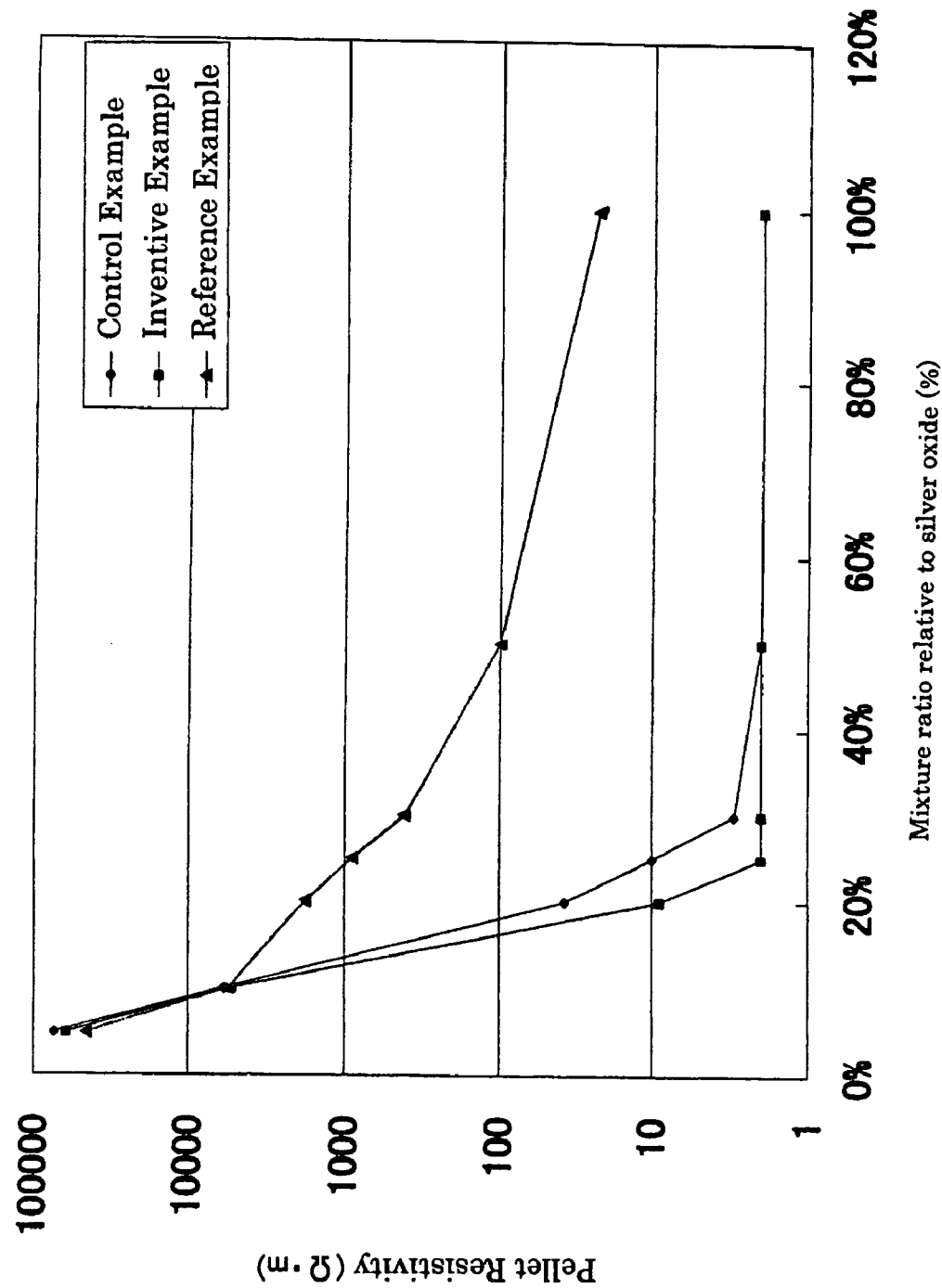
FIG. 2 shows the resistivities of battery positive electrode material comprising the Ag-excess Ni oxide of the invention blended with silver oxide.

The Ag$_{0.8}$Ni$_{1.2}$O$_2$ conductive compound according to the Example of this invention, described below, was blended with silver oxide and formed into pellets, and the relationship between the blend ratio and the resistivity of the pellets was plotted, and is shown in FIG. 2, in which the inventive Examples are denoted by the ■ symbol, showing a sharp decrease in resistivity up to a blend ratio of 25%. In FIG. 2, the ♦ symbol denotes the same relationship in the case of Control Example consisting of a conductive compound of AgNiO$_2$ (using that of Comparative Example 3) blended with silver oxide, showing that although the inventive Example has a lower silver content than the Control Example, it is not inferior in terms of conductivity improvement effect when blended with silver oxide. The symbol ▲ denotes the case of Comparative Example 6 as reference example material exhibiting another phase in FIG. 1, blended with silver oxide. Here, the resistivity decreases slowly, so the conductivity improvement effect is low, even when it is blended with silver oxide.

The Ag-excess Ni oxide conductive compound of the invention can be synthesized as a single-phase Ag-excess Ni oxide compound by reacting Ag salt and Ni salt in water to precipitate a silver-nickel oxide having excess nickel, adding an oxidizing agent and using adequate ripening to prevent the formation of secondary products such as silver oxide and nickel hydroxide.

From the experience, the present inventor found that when Ag salt and Ni salt were reacted in water to precipitate a silver-nickel oxide with excess nickel and the oxide was dried in the ordinary atmosphere, the particles took on brownish and did not provide the discharge capacity that was expected based on the silver content. The reason was found to be that atmospheric CO$_2$ is readily adsorbed due to the high specific surface area of an excess-nickel silver-nickel oxide. When the oxide reacts with CO$_2$, it produces silver carbonate that readily dissolves in alkali. Therefore, it was thought that when it is used as a positive electrode material, it could dissolve in an alkaline electrolyte, leading to shorting and self-discharge caused by separator degradation. The reaction that produces silver carbonate proceeds more readily in the drying step than during the wet reaction, so it was thought that in the drying step, the reaction between the CO$_2$ and the silver is promoted by thermal energy via the minute amounts of water on the surface of the particles. It is therefore desirable to as far as possible avoid contact with CO$_2$ in the atmosphere used in the drying step. In practice, the drying can be done in nitrogen or argon or another such inert gas, or in decarbonized air, or in a vacuum. That is, after using the above method to synthesize the single-phase Ag-excess Ni oxide compound, battery positive electrode material having good discharge characteristics is obtained by separating the precipitate from the liquid, washing it, and drying it in an atmosphere that does not contain CO$_2$.

The Ag-excess Ni oxide of the invention can be produced by a method comprising reacting an inorganic acid salt of Ag and an inorganic acid salt of Ni in an oxidizing alkaline aqueous solution, using the following procedure.

(1) Reacting the inorganic acid salt of Ag and the inorganic acid salt of Ni in water with an alkali hydroxide to obtain a neutralizing precipitate.

(2) Carrying out oxidation treatment to increasing metal ion valences by adding an oxidizing agent to the solution prior to, or during, the above neutralization reaction, or to the obtained precipitate suspension. It is preferable for the addition of the oxidizing agent to be divided into a plurality of stages before, during and after the neutralization reaction.

(3) Separating the precipitate after the oxidation treatment from the liquid, washing the precipitate, drying it in an atmosphere not containing CO$_2$, and crushing the resulting dried cake to powder.

NaOH or KOH can be employed as the alkali hydroxide used in the neutralization reaction. Although nitrate, sulfate, hydrochloride, and phosphate and the like of each metal can be used as the salts of Ag and Ni, it is preferable to use the nitrate or sulfate of the metals. Typically, the nitrate of each metal may be used. For AgNO$_3$, for example, Ni(NO$_3$)$_2$ having a desired number of moles can be used.

A higher alkalinity is better for the neutralization treatment. In the case of Ag+Ni+M, for example, the reaction proceeds more readily in the presence of around five times the alkalinity, in terms of molar ratio. Neutralization and oxidation treatments can both be conducted at a reaction temperature of from room temperature to 100° C., and preferably are conducted at 30 to 50° C. It is necessary to stir at an intensity at which the neutralization and oxidation reactions proceed uniformly. Even after the treatments end, the stirring is maintained at the required temperature for ripening.

The Ag/Ni ratio in the end compound, and by extension the atomic ratio of the Ag/Ni in the particles, can be adjusted to a value within the range 0.25 to less than 1 by adjusting the molar ratio of the silver nitrate and nickel used for the reaction.

The oxidation treatment comprises using an oxidizing agent to increase metal ion valences. The oxidizing agent can be added at the start of the neutralization reaction or during the neutralization, or added to the precipitate suspension. Thus, the neutralization and oxidation treatments can be done separately or at the same time. It is preferable for the addition of the oxidizing agent to be divided into a plurality of stages before, during and after the neutralization reaction. The oxidation treatment should be done with stirring, and at not more than 100° C., since too high a temperature will promote decomposition of the oxidizing agent. Substances that can be used as the oxidizing agent include, for example, $KMnO_4$, NaOCl, $H_2O_2$, $K_2S_2O_8$, $Na_2S_2O_8$, and ozone, but $K_2S_2O_8$, $Na_2S_2O_8$ or ozone are preferable, since impurities in the Ag-excess Ni oxide powder can be reduced by the use of an oxidizing agent thus constituted. It is necessary to use an amount of oxidizing agent that is enough to change the valences. This can be achieved by adding an amount of oxidizing agent that is at least equivalent to the valences concerned, and preferably is around twice the amount.

EXAMPLES

Before moving on to the following Examples of the invention, the methods used to measure the properties of the powder obtained in each case will be explained.

Particle diameter: Particle diameter was measured using a Helos laser diffraction analyzer manufactured by Sympatec GmbH, which employs a dry system in which the particles are dispersed by a high-pressure gas and laser diffraction used to analyze the particle diameter. In contrast to wet methods which have a major effect on samples and solvent affinity, this dry method enables particle diameter to be measured without any such effects, resulting in the case of this material in measured values having good reproducibility. The dispersion pressure can be set as desired; in this example, a dispersion pressure of 4.00 bar was used.

X-ray diffraction: An X-ray diffractometer manufactured by Rigaku Corporation was used. A CuKα X-ray source was used, and measurements were carried out at an X-ray voltage of 50 kV and current of 100 mA.

Specific surface area: This was measured using a BET method. The measurement was performed using a Quantachrome Jr surface area analyzer manufactured by Quantachrome Corporation.

Chemical analysis: Samples were dissolved in nitric acid and chemical analysis performed by the titration method.

$CO_2$ analysis: The method of JIS R9101 was used.

Battery evaluation: Service capacity of the sample powder was measured using a three-electrode cell. The measurement was conducted using a joined sample prepared by the following. About 100 mg of mixture of 95% sample powder and 5% PTFE was formed into a cylinder having a floor area of 1.77 $cm^2$, then the formed cylinder was bonded by pressure onto a stainless-steel mesh collector to form a joined sample. Metal zinc plates were used for the reference and negative electrodes; 50 mL of a 40% solution of KOH was used as the electrolyte. The discharge capacity was measured at the point at which the voltage reached 1.2 volts.

Resistivity: Samples of each of the powders were subjected to a pressure of 3 $t/cm^2$ to form cylindrical pellets having a sectional area of 1 $cm^2$, and copper electrode plates having an area larger than that of the pellet sectional area were affixed to the top and bottom of each pellet. The pellet thus sandwiched between the electrode plates was placed flat on a stainless-steel stand, and a stainless-steel weight with a load of 130 kgf was placed thereon. In that state, a lead line from each electrode was connected to an impedance measuring instrument and the electric resistance (pellet resistance) between the electrodes was measured. The resistance value of the instrument with no pellet in place was obtained beforehand and used to correct the measured values of the pellets.

Molding density: A metal die through which a vertical hole was formed having a sectional area of 1 $cm^2$ was prepared, and a pedestal having the same diameter as that of the hole was inserted into the hole, and 1 g of the sample powder was inserted on the pedestal. Then, a punch having the same diameter as that of the hole was inserted and placed under a load of 3 t to compress the powder for 3 minutes. The molding density was obtained from the thickness and weight of the molding thus formed.

Comparative Example 1

The Ag content, discharge capacity, molding density and resistivity of powder type silver oxide ($Ag_2O$ manufactured by Dowa Mining Co., Ltd. having an average particle diameter of 15 μm) used for commercial positive electrodes were measured. The results are shown in Table 1. This silver oxide had a purity of 99.9% or more, as calculated from the Ag content. The discharge capacity was 220 mAh/g, which was close to the theoretical capacity of silver oxide.

Comparative Example 2

The Ag content, discharge capacity, molding density and resistivity of granular type silver oxide (manufactured by Dowa Mining Co., Ltd. with an average particle diameter of 105 μm) used for commercial positive electrodes were measured. The results are shown in Table 1. The discharge capacity and resistivity were the same as those of Comparative Example 1.

Comparative Example 3

This is a comparative example with respect to $AgNiO_2$ (X/Y=1.0/1.0).

0.5 liter of pure water, 3.0 mols of NaOH and 0.5 mol of sodium persulfate were put into a 1-liter beaker and the temperature of the solution was adjusted to 30° C. One liter of an aqueous solution of silver nitrate equivalent to 0.25 mol of silver was added to the solution over a thirty-minute period, and the solution was maintained at 30° C. for one hour.

One liter of an aqueous solution of nickel nitrate equivalent to 0.25 mol of nickel was added to the solution over a thirty-minute period, and the solution was maintained at 30° C. for four hours and the reaction ended. The reaction slurry was filtered to obtain a black cake. The cake was thoroughly washed with pure water and then dried in a vacuum for 12 hours at 100° C. A pestle was then used to crush the dried cake. When X-ray diffraction was used to identify the black powder thus obtained, it was confirmed to be $AgNiO_2$. The X-ray diffraction chart of the powder is shown in FIG. 1. The results of the powder evaluation test are shown in Table 1.

Example 1a

This is an example of $Ag_xNi_yO_2$ (X/Y=0.96/1.04).

0.5 liter of pure water, 3.0 mols of NaOH and 0.25 mol of sodium persulfate were put into a 1-liter beaker and the temperature of the solution was adjusted to 30° C. One liter of an aqueous solution of silver nitrate equivalent to 0.24 mol of silver was added to the solution over a thirty-minute period, and the solution was maintained at 30° C. for two hours.

One liter of an aqueous solution of nickel nitrate equivalent to 0.26 mol of nickel was added to the solution over a thirty-minute period, and the solution was maintained at 30° C. for two hours. Then, a further 0.25 mol of sodium persulfate was added to the solution, which was maintained at 30° C. for 12 hours, after which the reaction was ended. The reaction slurry was filtered to obtain a black cake, which was thoroughly washed with pure water and then dried in a vacuum for 12 hours at 100° C. A pestle was then used to crush the dried cake. When X-ray diffraction was used to identify the black powder thus obtained, a peak similar to the peak of the $AgNiO_2$ of Comparative Example 3 was observed. The results of the powder evaluation test are shown in Table 1.

Example 1b

The same procedure as that of Example 1a was repeated, except that instead of the vacuum used in Example 1a, after washing the cake was dried in decarbonized air. The decarbonized air was obtained by passing air through a molecular sieve. The results of the powder evaluation test are shown in Table 1. The $CO_2$ analysis and discharge capacity test values obtained were the same as those of the powder of Example 1a.

Comparative Example 4

The same procedure as that of Example 1a was repeated, except that instead of the vacuum used in Example 1a, after washing the cake was dried in air. The results of the powder evaluation test are shown in Table 1. The powder had higher $CO_2$ than in the case of Example 1a and 1b, and a lower discharge capacity.

Example 2

This is an example of $Ag_xNi_yO_2$ (X/Y=0.80/1.20), and followed the same procedure as that of Example 1a except for the use of silver nitrate equivalent to 0.2 mol of silver and nickel nitrate equivalent to 0.3 mol of nickel. When X-ray diffraction was used to identify the black powder thus obtained, a peak similar to the peak of the $AgNiO_2$ of Comparative Example 3 was observed. The results of the powder evaluation test are shown in Table 1.

Example 3

This is an example of $Ag_xNi_yO_2$ (X/Y=0.60/1.40), and followed the same procedure as that of Example 1a except for the use of silver nitrate equivalent to 0.15 mol of silver and nickel nitrate equivalent to 0.35 mol of nickel. When X-ray diffraction was used to identify the black powder thus obtained, a peak similar to the peak of the $AgNiO_2$ of Comparative Example 3 was observed, as shown in FIG. 1. No peaks of silver oxide or nickel hydroxide or the like were observed. The results of the powder evaluation test are shown in Table 1.

Example 4a

This is an example of $Ag_xNi_yO_2$ (X/Y=0.40/1.60), for which the same procedure as that of Example 1a was used except for the use of silver nitrate equivalent to 0.10 mol of silver and nickel nitrate equivalent to 0.40 mol of nickel. A peak similar to the peak of the $AgNiO_2$ of Comparative Example 3 was observed, as shown in FIG. 1. No peaks of silver oxide or nickel hydroxide or the like were observed. The results of the powder evaluation test are shown in Table 1.

Example 4b

The same procedure as that of Example 4a was repeated, except that the cake was dried in decarbonized air instead of in a vacuum. The decarbonized air was obtained by passing air through a molecular sieve. The results of the powder evaluation test are shown in Table 1. The $CO_2$ analysis and discharge capacity test values were more or less the same as those of the powder of Example 4a.

Comparative Example 5

The same procedure as that of Example 4a was repeated, except that the cake was dried in air instead of in decarbonized air. Ordinary air was used that had not been subjected to decarbonization or the like. The results of the powder evaluation test are shown in Table 1. The $CO_2$ value was much higher than in the case of Examples 4a and 1b, and the discharge capacity was much lower.

Comparative Example 6

This is an example of $Ag_xNi_yO_2$ (X/Y=0.20/1.80), for which the same procedure as that of Example 1a was used except for the use of silver nitrate equivalent to 0.05 mol of silver and nickel nitrate equivalent to 0.45 mol of nickel. When X-ray diffraction was used to identify the black powder thus obtained, as shown in FIG. 1, a peak similar to the peak of $AgNiO_2$ was observed, but peaks of substances different to $AgNiO_2$ were also seen in the vicinity of $2\theta=43°$ and $2\theta=19°$. The results of the powder evaluation test are shown in Table 1, showing that the discharge capacity was lower than that of the inventive Examples, and the resistivity was higher.

TABLE 1

| | | Composition | | | Particle Diameter | | | Chem. Analysis Values | | | Bulk Density | Molding Density (g/ml) | Discharge capacity Up to 1.2 V | Discharge capacity (mAh/cc) | Resistivity (Ω·m) |
|---|---|---|---|---|---|---|---|---|---|---|---|---|---|---|---|
| | | Ag (x mol ratio) | Ni (y mol ratio) | x/y | Av. Dia. (µm) | <3 µm (%) | >21 µm (%) | BET (m2/g) | Ag (%) | CO2 (%) | | | (mAh/g) | | |
| Comp. Example 1 | Silver Oxide Powder | 1.00 | — | | 15 | | | 0.35 | 93.1 | | 0.80 | 6.40 | 220 | 1408 | >100000 |
| Comp. Example 2 | Silver Oxide Powder | 1.00 | — | | 150 | | | 0.16 | 93.1 | | 2.20 | 6.40 | 220 | 1408 | >100000 |
| Comp. Example 3 | Ag—Ni Oxide | 1.00 | 1.00 | 1.00 | 7 | 36 | 12 | 53.1 | 52.7 | | 0.80 | 4.08 | 200 | 816 | 1.8 |
| Example 1a | | 0.96 | 1.04 | 0.92 | 7 | 30 | 14 | 67.96 | 50.9 | 0.12 | 0.76 | 3.92 | 195 | 765 | 1.4 |

TABLE 1-continued

| | | Composition | | | Particle Diameter | | | Chem. Analysis Values | | | Mold- ing Density (g/ml) | Discharge capacity (mAh/g) Up to 1.2 V | Discharge capacity (mAh/cc) | Resistivity ($\Omega \cdot m$) |
|---|---|---|---|---|---|---|---|---|---|---|---|---|---|---|
| | | Ag (x mol ratio) | Ni (y mol ratio) | x/y | Av. Dia. ($\mu m$) | <3 $\mu m$ (%) | >21 $\mu m$ (%) | BET (m2/g) | Ag (%) | CO2 (%) | Bulk Density | | | |
| Example 1b | Example 1 dried in decarbonized air | 0.96 | 1.04 | 0.92 | | | | | | 0.12 | | 194 | | |
| Comp. Example 4 | Example 1 dried in air | 0.96 | 1.04 | 0.92 | | | | | | 0.90 | | 180 | | |
| Example 2 | | 0.80 | 1.20 | 0.67 | 6 | 33 | 12 | 111.1 | 44.6 | | 0.70 | 3.41 | 174 | 594 | 1.8 |
| Example 3 | | 0.60 | 1.40 | 0.43 | 7 | 30 | 18 | 153.3 | 35.7 | | 0.60 | 2.92 | 151 | 441 | 2.6 |
| Example 4a | | 0.40 | 1.60 | 0.25 | 7 | 30 | 19 | 173.2 | 31.5 | 0.15 | 0.52 | 2.53 | 131 | 331 | 3.5 |
| Example 4b | Example 4a dried in nitrogen atm. | 0.40 | 1.60 | 0.25 | | | | | | 0.18 | | | 129 | | |
| Comp. Example 5 | Example 4a dried in air | 0.40 | 1.60 | 0.25 | | | | | | 1.53 | | | 85 | | |
| Comp. Example 6 | | 0.20 | 1.80 | 0.11 | 12 | 19 | 29 | 184 | 13.7 | | 0.49 | 2.21 | 82 | 181 | 22.9 |

The results listed in Table 1 reveal the following.

(1) Although the Ag-excess Ni oxide of the present invention contains more excess Ni than in the case of $AgNiO_2$, it has the same crystal structure as $AgNiO_2$ and, as shown by a comparison of Examples 1 to 4 with Comparative Example 3, it functions as a low-impedance material having good conductivity despite its low Ag content.

(2) Moreover, the composition of this material, with its low Ag content, also functions as an active substance, manifesting a discharge capacity corresponding to that Ag content.

(3) However, when the amount of Ni becomes too excessive, as in the case of Comparative Example 6, a phase appears that is different from $AgNiO_2$, decreasing the conductivity.

Example 5

In this Example, a conductive compound consisting of Ag—Ni excess oxide was blended with silver oxide and the material formed into pellets for use as battery positive electrode material, and the resistivity of the material was investigated.

As "Control Examples", pellets were formed by blending the $AgNiO_2$ of Comparative Example 3 with the silver oxide of Comparative Example 1 in different ratios, and the resistivity of the pellets was measured. Table 2 shows the results, and the Ag content (in wt %) of the pellets.

For the inventive "Examples", pellets were formed by blending the $Ag_{0.8}Ni_{1.20}O_2$ of Example 2 with the silver oxide of Comparative Example 1 in different ratios, and the resistivity in each case was measured. Table 2 shows the results.

For the "Reference Examples", pellets were formed by blending the powder of Comparative Example 6 with the silver oxide of Comparative Example 1 in different ratios, and the resistivity in each case was measured. Table 2 shows the results, and FIG. 2 is a graph of the resistivity values produced using the values in Table 2.

TABLE 2

| | Control Examples | | Examples | | Reference Examples | |
|---|---|---|---|---|---|---|
| Amount of mixture relative to silver oxide | Resistivity ($\Omega \cdot m$) | Ag Content (%) | Resistivity ($\Omega \cdot m$) | Ag Content (%) | Resistivity ($\Omega \cdot m$) | Ag Content (%) |
| 0% Only silver oxide | >100000 | 93 | >100000 | 93 | >10000 | 93 |
| 5% | 73000 | 91 | 61000 | 91 | 45000 | 89 |
| 10% | 5900 | 89 | 5300 | 88 | 5600 | 85 |
| 20% | 37 | 85 | 9 | 83 | 1800 | 77 |
| 25% | 10 | 83 | 2 | 81 | 900 | 73 |
| 30% | 3 | 81 | 2 | 78 | 410 | 69 |
| 50% | 2 | 73 | 2 | 69 | 100 | 53 |
| 100% Ag—Ni oxide | 2 | 53 | 2 | 45 | 23 | 13 |

From Table 2 and FIG. 2, it can be seen that pellets formed by blending the Ag-excess Ni oxide of this invention with silver oxide has the same conductivity imparting effect as $AgNiO_2$, despite having a lower silver content than $AgNiO_2$. Because the powder of Comparative Example 6 includes phases other than that of the conductive compound, it does not have the excellent conductivity imparting effect of the inventive Example.

What is claimed is:

1. A battery positive electrode material comprising a conductive chemical compound represented by a general formula $Ag_xNi_yO_2$ (wherein X/Y is smaller than 0.92 and not smaller than 0.25), and which has an X-ray diffraction main peak identical to that of $AgNiO_2$ (wherein X=Y=1).

2. A battery positive electrode material according to claim 1, which comprises a crystal that does not exhibit an X-ray diffraction peak that typifies $Ag_2O$ and AgO crystals.

3. A battery positive electrode material according to claim 1, which comprises a crystal that does not exhibit an X-ray diffraction peak that typifies $Ni(OH)_2$ and NiOOH crystals.

4. A battery positive electrode material comprising the battery positive electrode material according to claim 1, being blended with silver oxide ($Ag_2O$).

5. A method of manufacturing the battery positive electrode material according to claim 1, comprising reacting Ag salt and Ni salt in water to precipitate a chemical compound represented by the general formula $Ag_xNi_yO_2$ (wherein X/Y is smaller than 0.92 and not smaller than 0.25), separating the precipitate from the liquid, washing the precipitate, and dying the precipitate in an atmosphere that does not contain $CO_2$.

6. A battery positive electrode material according to claim 2, which comprises a crystal that does not exhibit an X-ray diffraction peak that typifies $Ni(OH)_2$ and NiOOH crystals.

7. A battery positive electrode material comprising the battery positive electrode material according to claim 2, being blended with silver oxide ($Ag_2O$).

8. A battery positive electrode material comprising the battery positive electrode material according to claim 3, being blended with silver oxide ($Ag_2O$).

9. A method of manufacturing the battery positive electrode material according to claim 2, comprising reacting Ag salt and Ni salt in water to precipitate a chemical compound represented by the general formula $Ag_xNi_yO_2$ (wherein X/Y is smaller than 0.92 and not smaller than 0.25), separating the precipitate from the liquid, washing the precipitate, and drying the precipitate in an atmosphere that does not contain $CO_2$.

10. A method of manufacturing the battery positive electrode material according to claim 3, comprising reacting Ag salt and Ni salt in water to precipitate a chemical compound represented by the general formula $Ag_xNi_yO_2$ (wherein X/Y is smaller than 0.92 and not smaller than 0.25), separating the precipitate from the liquid, washing the precipitate, and dying the precipitate in an atmosphere that does not contain $CO_2$.

* * * * *